US011736203B1

(12) United States Patent
Esman et al.

(10) Patent No.: US 11,736,203 B1
(45) Date of Patent: Aug. 22, 2023

(54) RADIO FREQUENCY (RF) SIGNAL PROCESSOR WITH PHOTONIC LOCAL OSCILLATOR (LO) PHASE CONTROL

(71) Applicant: Rockwell Collins, Inc., Cedar Rapids, IA (US)

(72) Inventors: Ronald D. Esman, Mclean, VA (US); Daniel J. Esman, Ellicott City, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/850,620

(22) Filed: Jun. 27, 2022

(51) Int. Cl.
| H04B 10/61 | (2013.01) |
| H04B 10/2575 | (2013.01) |
| H04J 14/00 | (2006.01) |
| H04B 10/516 | (2013.01) |

(52) U.S. Cl.
CPC ....... *H04B 10/613* (2013.01); *H04B 10/2575* (2013.01); *H04B 10/5161* (2013.01); *H04B 10/616* (2013.01); *H04J 14/002* (2013.01)

(58) Field of Classification Search
None
See application file for complete search history.

(56) References Cited

U.S. PATENT DOCUMENTS

| 8,611,759 | B1 | 12/2013 | Kvavle et al. |
| 8,805,197 | B2 * | 8/2014 | Delfyett ............. H04J 14/005 |
| | | | 398/140 |
| 10,139,699 | B2 * | 11/2018 | DeSalvo .............. G02F 1/21 |
| 10,250,330 | B1 | 4/2019 | Cabello et al. |
| 10,418,943 | B2 * | 9/2019 | Kanter ............... H03D 7/161 |
| 10,627,849 | B1 | 4/2020 | Scofield et al. |
| 10,838,061 | B1 * | 11/2020 | Crouch ............. G01S 17/931 |
| 11,092,871 | B2 * | 8/2021 | Morton ............... G02F 1/212 |

(Continued)

FOREIGN PATENT DOCUMENTS

WO    2018040224 A1    3/2018

*Primary Examiner* — Jai M Lee
(74) *Attorney, Agent, or Firm* — Suiter Swantz pc llo

(57) ABSTRACT

A system and method for radio frequency (RF) signal processing via photonic local oscillator (LO) phase control generates a set of N optical carriers and M sets of control inputs, each control input including an amplitude and/or phase control for the $n^{th}$ carrier. Each $n^{th}$ optical carrier is split into an RF path and M LO paths, the RF path including N electro-optical (EO) modulators for amplitude/phase modulation of each $n^{th}$ carrier per a set of N RF input signals and each $m^{th}$ LO path including a set of N EO modulators for amplitude/phase modulation of each $n^{th}$ carrier per the $m^{th}$ control input. Demodulators generate M in-phase and quadrature (I/Q) balanced optical outputs based on the multiplexed N combined RF optical outputs and each $m^{th}$ set of N combined LO optical outputs. The M I/Q balanced optical outputs are converted to the electrical and then to the digital domain.

16 Claims, 6 Drawing Sheets

(56) References Cited

U.S. PATENT DOCUMENTS

| | | | |
|---|---|---|---|
| 11,374,654 B2* | 6/2022 | Morton | H04B 10/25759 |
| 11,405,113 B2* | 8/2022 | Dillon | H04B 10/5165 |
| 2011/0091217 A1 | 4/2011 | Liu et al. | |
| 2021/0242941 A1* | 8/2021 | Murakowski | H04B 10/00 |
| 2021/0266063 A1* | 8/2021 | Fermann | H04J 14/0227 |

* cited by examiner

FIG. 5A

512 — Providing M sets of N LO-modulated optical carriers via at least one of amplitude modulation or phase modulation, via each $m^{th}$ set of N second EO modulators, of each $m^{th}$ set of N optical carriers according to at least one of the amplitude control $A_{nm}$ or the phase control $\theta_{nm}$ 514 — Providing, via a first mux, a combined RF-modulated optical output by multiplexing the N RF-modulated optical carriers 516 — Providing, via a set of M second muxes, M combined LO-modulated optical outputs by multiplexing the M sets of N LO-modulated optical carriers 518 — Generating, via a set of M coherent receivers, M in-phase (I) and quadrature (Q) (I/Q) balanced optical outputs by demodulating the combined RF-modulated optical output and each $m^{th}$ combined LO-modulated optical output 520 — Converting, via one or more balanced photodiode pairs, each $m^{th}$ I/Q balanced optical output into an $m^{th}$ modulated electrical signal 522 — Producing a set of M modulated digital outputs by digitizing each $m^{th}$ modulated electrical signal

FIG. 5B

RADIO FREQUENCY (RF) SIGNAL PROCESSOR WITH PHOTONIC LOCAL OSCILLATOR (LO) PHASE CONTROL

GOVERNMENT SUPPORT

This technology was developed with U.S. government support under contract number NR0000-21-C-0297 awarded by the National Reconnaissance Office. The U.S. government has certain rights in this invention.

BACKGROUND

Broadly speaking, communications equipment involves the processing of radio frequency (RF) signals, e.g., communications signals transmitted over the RF band at frequencies between 1 kHz and 300 GHz. For example, processing of RF signals may involve one or more of amplification, filtering, frequency conversion, remoting, storage, delay, and/or addition (e.g., in the vector sense) of the RF signals. As digital signal processing (DSP) options become faster and more cost effective, RF processing is increasingly shifting from the analog to the digital domain. However, DSP is not a problem-free solution in all cases. For example, analog-to-digital converters (ADC) provide a bridge between the analog and digital domains, but this bridge may also impose a bottleneck. ADCs may be associated with poor signal quality and high noise levels, potentially reducing signal-to-noise ratio (SNR) as much as 20 dB. Further, broadband ADCs may not have sufficient dynamic range or effective number of bits (ENOB) for high-speed DSP. While broadband ADCs may be capable of high data rates (e.g., 120 Gbps, or 12 bits at 10 GS/s), low-power field programmable gate arrays (FPGAs) or application specific integrated circuits (ASICs) may not be able to process such large data streams in real time.

Accordingly, there may be a need to process RF signals prior to digitization, in order to minimize signal loss while maximizing SNR. RF signal processing in the optical domain, by applying photonics to RF processing systems, may provide a partial solution. For example, optical beamformers may combine RF signals after applying a predetermined phase shift or time delay. However, this approach is associated with its own set of challenges, e.g., excessive signal loss limiting output SNR; signal summation subsequent to, rather than during, photonic operations; no capacity for arbitrary, rather than predetermined, phase shifts; coherent noise between signals at the photodiode; and/or limitation to a single output rather than multiple outputs.

SUMMARY

In a first aspect, a system for processing of multiple radio frequency (RF) signals via photonic local oscillator (LO) phase control is disclosed. In embodiments, the system includes a laser or photonic source for providing a set of N optical carriers (wherein N is an integer). The system includes M sets of N control inputs, each $m^{th}$ control input comprising at least one of an amplitude control $A_{nm}$ or a phase control $\theta_{nm}$ associated with the $n^{th}$ optical carrier (wherein m, M, n are integers and $1 \leq m \leq M$, $1 \leq n \leq N$. The system includes optical splitters for copying each $n^{th}$ optical carrier into an RF optical path and M LO optical paths. The RF optical path includes a set of N electro-optical (EO) modulators for receiving a set of N RF input signals and for amplitude/phase modulation of each $n^{th}$ optical carrier according to an $n^{th}$ RF input signal of the set, producing an $n^{th}$ modulated optical output. The RF optical path includes a multiplexer (mux) for combining the N RF-modulated optical outputs. Each LO optical path (e.g., each $m^{th}$ LO optical path) includes a set of N EO modulators for amplitude/phase modulation of each $n^{th}$ optical carrier according to an $m^{th}$ control input, e.g., an amplitude control $A_{nm}$ and/or a phase control $\theta_{nm}$. Each $m^{th}$ LO optical path includes a mux for combining the N LO-modulated (e.g., control input-modulated) optical outputs. The system includes a set of M coherent receivers, each $m^{th}$ coherent receiver including: an in-phase/quadrature (I/Q) demodulator for generating an $m^{th}$ I/Q balanced optical output by demodulating the combined RF-modulated optical output and each $m^{th}$ set of N LO-modulated optical outputs, and balanced photodiode pairs for converting each $m^{th}$ I/Q balanced optical output into an $m^{th}$ modulated electrical signal. The system includes digitizers for converting the M modulated electrical signals into M balanced digital outputs.

In some embodiments, the balanced photodiode pairs provide low-pass filtering of each $m^{th}$ modulated electrical signal.

In some embodiments, the digitizers include electrical filters for pre-digitization filtering of each $m^{th}$ modulated electrical signal.

In some embodiments, the photonic source includes pulsed sources (e.g., mode locked lasers (MLL) or continuous-wave (CW) laser sources).

In some embodiments, the system includes digital signal processors in communication with the digitizers and configured for digital filtering and/or additional processing of the M balanced digital outputs.

In some embodiments, the photonic source includes an optical frequency comb (OFC) for providing the set of N optical carriers (e.g., optical tones) wherein each adjacent pair of optical tones are separated in frequency by a difference frequency ΔF.

In some embodiments, the OFC wherein each adjacent pair of optical tones are separated in frequency by a difference frequency ΔF is associated with the RF optical path, and the LO-modulated optical paths are associated with an OFC wherein each adjacent pair of optical tones are separated in frequency by a difference frequency ΔF+δf.

In some embodiments, the EO modulators in the RF and LO optical paths include amplitude modulators, intensity modulators, phase shifters, and/or Mach-Zehnder modulators (MZM).

In a further aspect, a method for RF signal processing via photonic LO phase control is also disclosed. In embodiments, the method includes generating, via a photonic source, a set of N optical carriers. The method includes copying, via a set of N optical splitters, each $n^{th}$ optical carrier into an RF optical path and M local oscillator (LO) optical paths. The method includes receiving, via a set of N electro-optical (EO) modulators associated with the RF optical path, a set of N RF input signals. The method includes receiving, via M sets of N EO modulators associated with the M LO optical paths, M sets of N control inputs, where each $n^{th}$ control input includes an amplitude control and/or a phase control for the $n^{th}$ optical carrier. The method includes providing a set of N RF-modulated optical carriers by at least one of amplitude modulation or phase modulation, via each $n^{th}$ EO modulator on the RF optical path, of each $n^{th}$ optical carrier according to the $n^{th}$ RF input signal. The method includes providing M sets of N LO-modulated optical carriers by at least one of amplitude modulation or phase modulation, via each $m^{th}$ set of N EO modulators on each $m^{th}$ LO optical path, of each $m^{th}$ set of N optical carriers according to the amplitude and/or phase controls. The method includes providing a combined RF-modulating optical output by multiplexing the N RF-modulated optical carriers. The method includes providing M combined LO-modulated optical outputs by multiplexing the M sets of N LO-modulated optical carriers. The method includes generating, via M coherent receivers, M in-phase/quadrature (I/Q) balanced optical outputs by demodulating the combined RF-modulated optical output and each $m^{th}$ combined LO-modulated optical output. The method includes converting, via balanced photodiode pairs, each $m^{th}$ I/Q balanced optical output into an $m^{th}$ modulated electrical signal. The method includes producing a set of M modulated digital outputs by digitizing each $m^{th}$ modulated electrical signal.

In some embodiments, the method includes low-pass filtering of the $m^{th}$ modulated electrical signal via the balanced photodiode pairs.

In some embodiments, the method includes electrical filtering of each $m^{th}$ I/Q balanced optical output prior to digitization.

In some embodiments, the method includes digital filtering of the M modulated digital outputs subsequent to digitization.

In some embodiments, the photonic source includes pulsed sources (e.g., mode locked lasers (MLL) or continuous-wave (CW) laser sources).

In some embodiments, the method includes providing the set of N optical carriers via an optical frequency comb (OFC) associated with the RF optical path, wherein each adjacent pair of $n^{th}$ and $(n+1)^{th}$ optical carriers are separated in frequency by a difference frequency $\Delta F$.

In some embodiments, the method includes providing a set of N optical carriers via an optical frequency comb (OFC) associated with the LO optical paths, wherein each adjacent pair of $n^{th}$ and $(n+1)^{th}$ optical carriers are separated in frequency by a difference frequency $\Delta F + \delta f$.

In some embodiments, the EO modulators in the RF and LO optical paths include amplitude modulators, intensity modulators, phase shifters, and/or Mach-Zehnder modulators (MZM).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 5A and 5B are flow diagrams illustrating a method for processing RF input signals via photonic LO phase control according to example embodiments of this disclosure.

DETAILED DESCRIPTION

Figure 1:
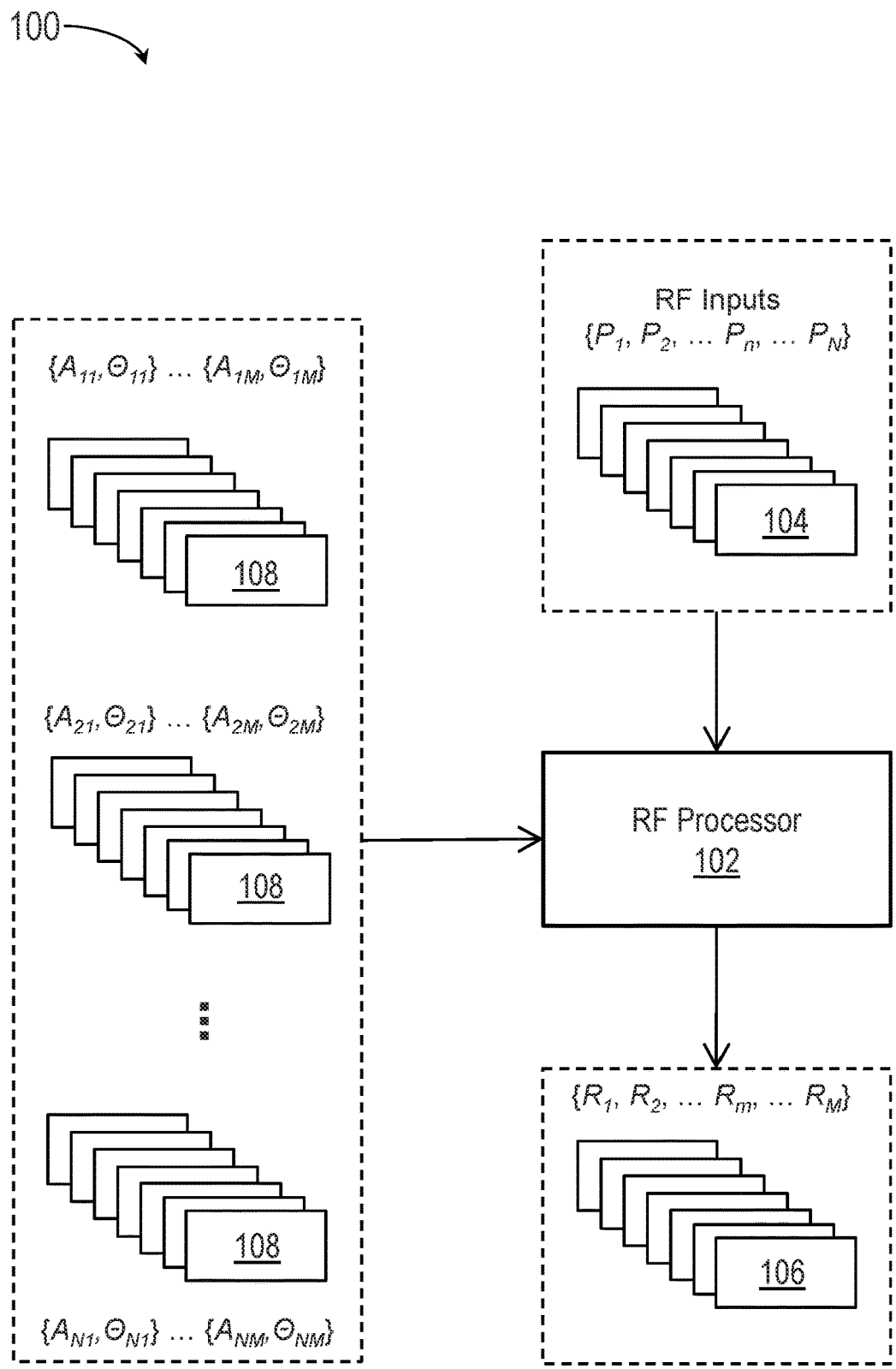
FIG. 1 is a block diagram broadly illustrating photonic processing of multiple RF input signals according to multiple control inputs according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for processing multiple RF signals in the optical domain, simultaneously calculating multiple vector additions for multiple RF input signals and generating multiple outputs while minimizing signal loss and maximizing SNR. Further, input signal summation in the optical domain may avoid complexity, power consumption, and latency issues associated with RF processing components or digital signal processing. Coherent noise at the photodiode end of the optical path may be avoided. The capacity for arbitrary, rather than predetermined, phase shifts allows greater flexibility with minimal added hardware.

Referring to FIG. 1, a system 100 for processing of multiple RF input signals is shown. For example, an RF processor 102 may receive N sinusoidal RF input signals $\{P_1, P_2, \ldots P_n, \ldots P_N\}$ (104), where n, N are integers, $1 \leq n \leq N$, and $$P_n = p_n \sin(\omega t + \varphi_n)$$

Before vector additions, each input RF signal 104 may be adjusted, e.g., weighting the amplitude of the RF input signal by $A_n$ and/or phase shifting the RF input signal by $\theta_n$ such that the output R (106) of the RF processor 102 may be, for the set of RF input signals $P_1 \ldots P_N$:

$$R = \sum_{n=1}^{N} A_n p_n \sin[\omega t + \varphi_n + \theta_n]$$

In some embodiments, there may be a need for multiple simultaneous calculations involving the same set of input RF signals 104 ($P_1 \ldots P_N$) according to multiple sets of control inputs $\{A_{nm}, \theta_{nm}\}$ (108), where m is an integer. Accordingly, the output R (106) of the RF processor 102 may thus comprise M multiple outputs 106, where M is an integer and $1 \leq m \leq M$, such that for each $m^{th}$ output $R_m$:

$$R_m = \sum_{n=1}^{N} A_{nm} p_n \sin[\omega t + \varphi_n + \theta_{nm}]$$

Figure 2:
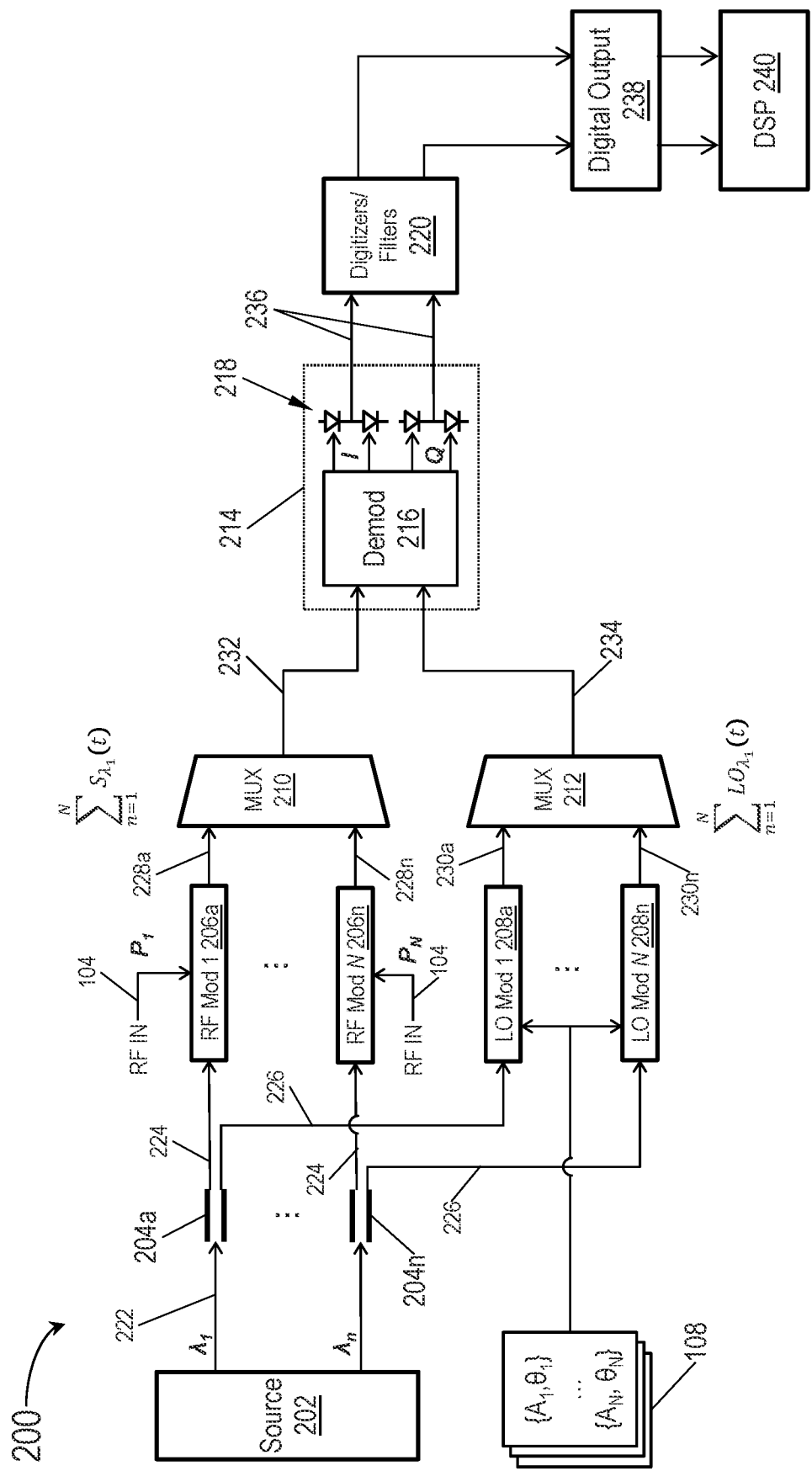
FIG. 2 is a block diagram illustrating a system for photonic processing as outlined by FIG. 1 via photonic local oscillator (LO) phase control.

Referring now to FIG. 2, the system 200 for processing of multiple RF input signals 104 may be implemented and may function similarly to the system 100, except that the system 200 may provide RF processing in the optical domain via photonic local oscillator (LO) phase control is disclosed. The system 200 may include a photonic source 202, optical splitters 204 (204a . . . 204n), electro-optical (EO) radio frequency (RF) modulators 206 (206a . . . 206n), EO local oscillator (LO) modulators 208 (208a . . . 208n), multiplexers 210, 212 (muxes), coherent receiver 214 (e.g., including in-phase/quadrature (I/Q) demodulator 216 and photodiodes 218), and digitizer 220 (e.g., analog-digital converters (ADC)).

In embodiments, the system 200 may generate a set of N optical carriers 222 via the photonic source 202, each $n^{th}$ optical carrier associated with a wavelength $\lambda_n$ (e.g., wherein n, N are integers and $1 \leq n \leq N$). For example, the photonic source 202 may include a bank of at least two CW lasers. Additionally or alternatively, the photonic source 202 may include a mode-locked laser (MLL), pulse-modulated optical carriers, or other like pulsed photonic source. In embodiments, the use of a pulsed photonic source 202 may prevent damage to the photodiodes 218. For example, as the photodiodes 218 may be subject to damage from excessive average optical power, the photonic source 202 may provide a pulsed optical carrier 222 having a high peak optical power (e.g., associated with a sampling rate) but a low average optical power (e.g., blocking the optical carrier when not being sampled), such that the photodiode average power damage level is not reached.

In embodiments, the optical splitters 204a-204n may separate or copy each optical carrier 222 of the set of N optical carriers 222 into an upper signal path 224 (e.g., RF path) and a lower local oscillator (LO) path 226. For example, with respect to the upper signal paths 224, each $n^{th}$ optical carrier 222 may be modulated by the $n^{th}$ EO RF modulator 206a-206n according to the $n^{th}$ RF input signal 104a-104n. In embodiments, the set of N EO RF modulators 206a-206n may include Mach-Zehnder modulators (MZM), intensity modulators, or any like EO modulators. For example, each EO RF modulator 206a-206n may be biased at its null point, eliminating the original optical carrier 222 and providing as output RF-modulated sideband signals 228a-228n, collectively 228 (e.g., as collected and multiplexed by multiplexer 210 at time t):

$$\sum_{n=1}^{N} S_{\lambda_n}(t).$$

In embodiments, with respect to the lower LO paths 226, each $n^{th}$ optical carrier 222 may be amplitude-adjusted and/or phase-adjusted by the $n^{th}$ EO LO modulator 208a-208n according to the $n^{th}$ control input 108 (e.g., control signal $\{A_{nm}, \theta_{nm}\}$ including amplitude control $A_{nm}$ and phase control $\theta_{nm}$), providing as output LO-modulated sideband signals 230a-230n, collectively 230 (e.g., as collected and multiplexed by multiplexer 212 at time t):

$$\sum_{n=1}^{N} LO_{\lambda_n}(t).$$

The set of N EO LO modulators 208a-208n may include phase shifters, Mach-Zehnder modulators (MZM), intensity modulators, or any like EO modulators.

In embodiments, the coherent receiver 214 may incorporate I/Q demodulator 216 and photodiodes 218 (e.g., balanced photodiode pairs). For example, the I/Q demodulator 216 may combine the modulated optical outputs 232, 234 (e.g., of muxes 210, 212 (e.g., $$\sum_{n=1}^{N} S_{\lambda_n}(t) \text{ and } \sum_{n=1}^{N} LO_{\lambda_n}(t))$$

with nominal (e.g., 0°) and relative (e.g., 90°) phase shifts to produce $$\sum_{n=1}^{N} S_{\lambda_n}(t) \cdot \left(\sum_{n=1}^{N} LO_{\lambda_n}(t)\right)^*$$

in balanced in-phase (I) and quadrature (Q) optical outputs, each of the two balanced optical outputs feeding a balanced photodiode pair 218 each. (Here the asterisk (*) refers to complex conjugation.)

In embodiments, the two balanced photodiode pairs 218 each produce an in-phase or quadrature RF modulated electrical signal 236 that may be filtered and/or digitized (e.g., by digitizers/electrical filters 220), resulting in a digital output R (238) comprising I and Q bitstreams. In some embodiments, the balanced photodiode pairs 218 may further (e.g., if the photodiodes provide high capacitance and resistance) provide low-pass filtering of the modulated electrical signal 236 prior to digitization. In embodiments, digital signal processing 240 (DSP) may be applied to the digital output R (238) to add I+jQ and remove from the digital output R negative frequencies associated with conjugate phase shifts. For example, the digital output R (238) may be (at time t):

$$\sum_{n=1}^{N} S_{\lambda_n}(t) \cdot LO^*_{\lambda_n}$$

In some embodiments, DSP 240 may filter the digital output R (238) in the digital domain, e.g., if no signal filtering has occurred in the electrical domain as described above.

Figure 3A:
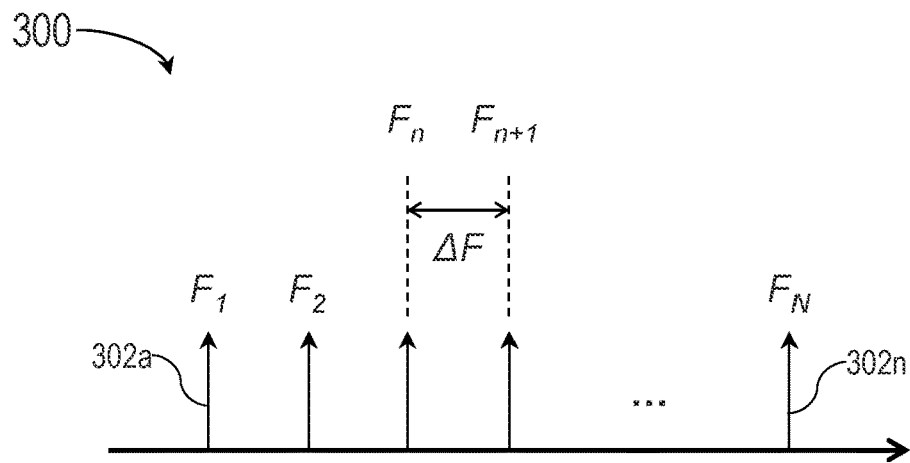
FIG. 3A is a block diagram illustrating an optical frequency comb (OFC)

Referring now to FIG. 3A, an optical frequency comb 300 (OFC) is shown.

In embodiments, the photonic source (202, FIG. 2) may include an OFC 300 such that the set of N optical carriers 222 $\{\lambda_1, \lambda_2, \ldots \lambda_n, \ldots \lambda_N\}$ is generated by the OFC and comprises a sequence or set of optical tones or "lines" 302 (302a . . . 302n) as they would appear to an optical spectrum analyzer. For example, each individual optical tone 302a-302n may function as a nominally coherent single frequency laser at a frequency $F_1, F_2, \ldots F_n, \ldots F_N$, wherein the frequencies $F_n, F_{n+1}$ of each adjacent pair of optical tones $\lambda_n, \lambda_{n+1}$ are separated by a difference frequency $\Delta F$. In embodiments, all optical tones 302a-302n may reside in a single optical waveguide (e.g., optical fiber).

Figure 3B:
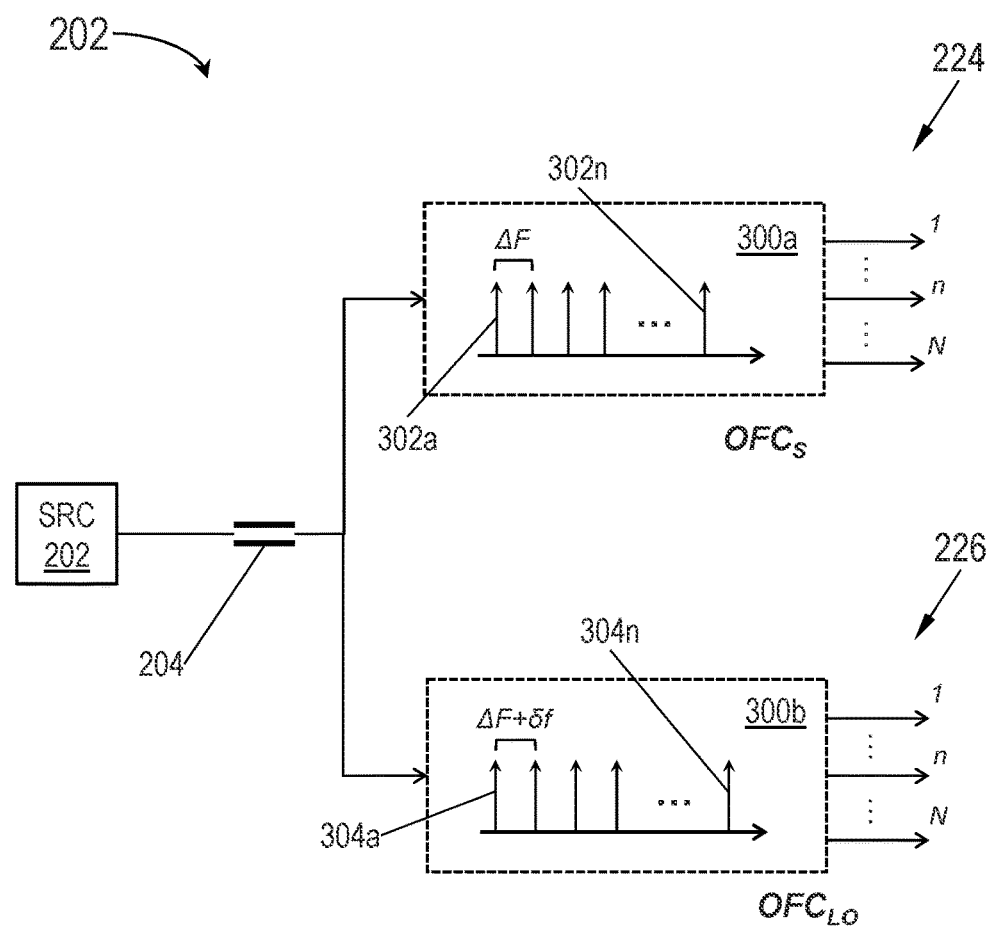
FIG. 3B is a block diagram illustrating a photonic source of the system of FIG. 2 incorporating the OFC of FIG. 3A.

Referring also to FIG. 3B, in some embodiments the lower LO optical path(s) 226 may be frequency-shifted relative to the upper RF optical path 224. For example, the photonic source 202 may include a single frequency laser, continuous wave (CW) laser, or pulsed photonic source. In embodiments, the photonic source 202 may be split (via optical splitter 204) into two copies respectively directed to vernierly related optical frequency combs OFCs and OFC$_{LO}$ (300a, 300b). In embodiments, the OFCs 300a may provide a set of N optical tones 302a-302n wherein each adjacent pair of optical tones is separated in frequency by a difference frequency $\Delta F$ (as shown above by FIG. 3A). For example, the N optical tones 302a-302n generated by the OFCs 300a may provide the set of N optical carriers for the upper RF optical path 224.

In some embodiments, the photonic source 202 may include an OFC$_{LO}$ 300b for each lower LO optical path 226 (e.g., for each of M lower LO optical paths, as shown below by FIG. 4). The OFC$_{LO}$ 300b may be implemented and may function similarly to the OFCs 300a, except that the N optical tones 304a-304n generated by the OFC$_{LO}$ 300b may each be spaced by a difference frequency $\Delta F+\delta f$ distinct from the difference frequency $\Delta F$ associated with the OFCs 300a. Similar to the optical tones 302a-302n, all optical tones 304a-304n may reside in a single optical waveguide (e.g., optical fiber). In some embodiments, the OFCs 300a may have at least one optical tone (302a-302n) phase coherent with at least one optical tone (304a-304n) from the OFC$_{LO}$ 300b, where the coherency is established by the use of the common single frequency laser (photonic source 202).

Other tones from both OFCs 300a, 300b may also be phase coherent but with a frequency offset, as is known in the art.

Figure 4:
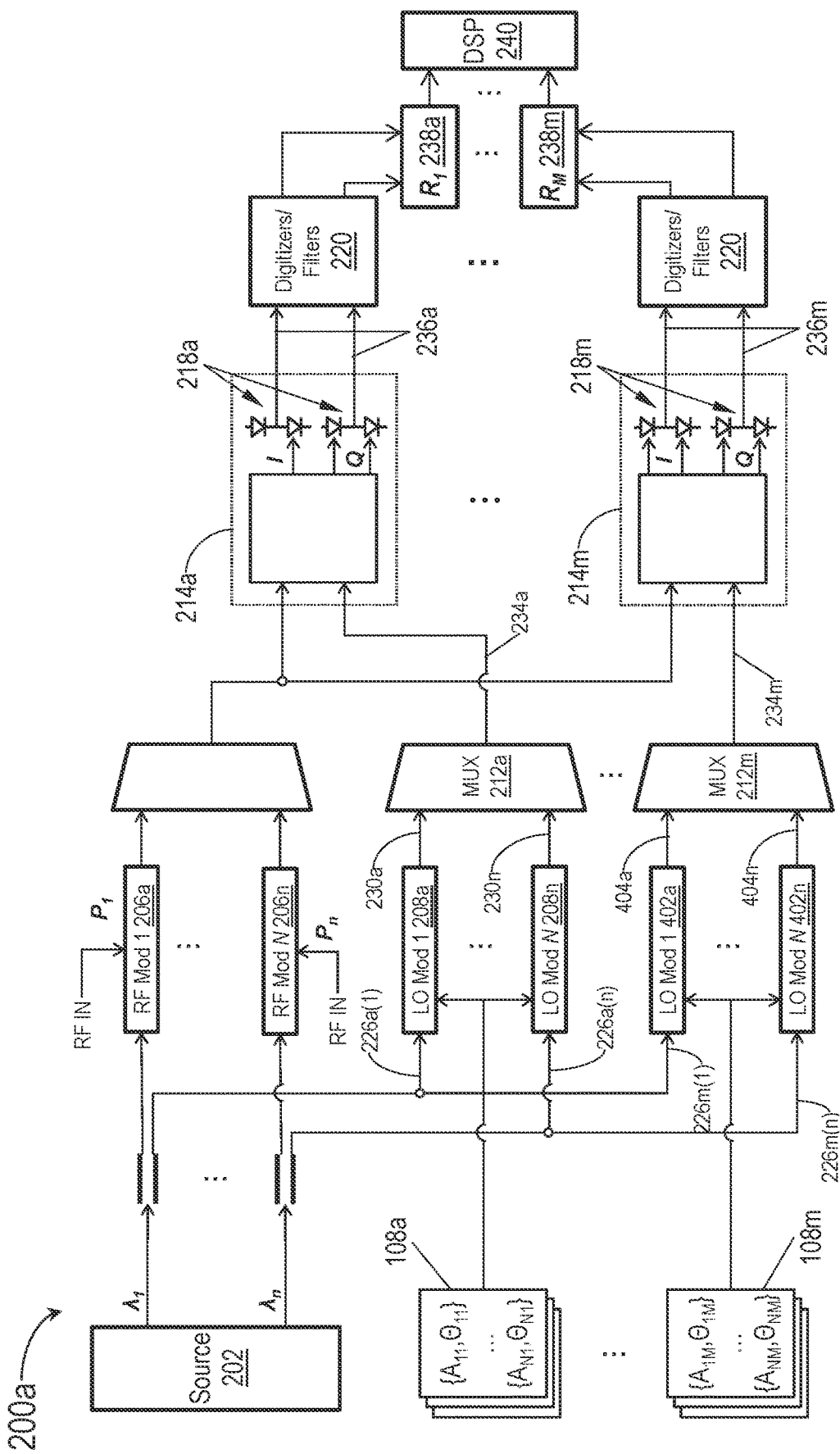
FIG. 4 is a block diagram illustrating the system of FIG. 2 configured for multiple sets of control inputs and multiple simultaneous digital outputs.

Referring now to FIG. 4, the system 200a may be implemented and may function similarly to the system 200 of FIG. 2, except that the system 200a may be configured for M multiple control inputs 108a-108m (e.g., where M>1), M sets of N lower LO paths 226a(1)-226a(n), 226m(1)-226m(n), and M digital outputs 234a-234m. For example, each $m^{th}$ control input 108a-108m (e.g., each $m^{th}$ set of N control inputs/control signals $\{A_{1m}, \theta_{1m} \ldots A_{nm}, \theta_{nm}\}$) may be associated with a set of N lower LO paths 226m(a)-226m(n) including a set of N EO LO modulators (208a-208n, 402a-402n), a mux 212a-212m for multiplexing (234a-234m) the N LO-modulated optical outputs (230a-230n, 404a-404n) of each set (e.g., each $m^{th}$ set of M sets) of N EO LO modulators, and a coherent receiver 214a-214m for combining $$\sum_{n=1}^{N} S_{\lambda_n, m}(t) \text{ and } \sum_{n=1}^{N} LO_{\lambda_n, m}(t)$$

to produce $$\sum_{n=1}^{N} S_{\lambda_n}(t) \cdot \left(\sum_{n=1}^{N} LO_{\lambda_n}(t)\right)^*$$

in-phase and quadrature (I/Q) balanced optical outputs, each I/Q balanced optical output feeding a balanced photodiode pair 218a-218m to produce an $m^{th}$ in-phase or quadrature RF output 236a-236m that may be low-pass filtered and digitized (e.g., by digitizers 220a-220m or as disclosed above with respect to the system 200 of FIG. 2), resulting in an $m^{th}$ digital output R$_m$ (238a-238m) comprising I and Q bitstreams. Similar to the filtered digital output R (106, 238) of FIGS. 1 and 2, each $m^{th}$ filtered digital output 238a . . . 238m may be:

$$\sum_{n=1}^{N} S_{\lambda_n}(t) \cdot LO^*_{\lambda_n, m}$$

which is an output R$_m$ of the required M digital outputs $\{R_1, R_2, \ldots R_m, \ldots R_M\}$ (106, 238a-238m):

$$R_m = \sum_{n=1}^{N} A_{nm} p_n \sin[\omega t + \varphi_n + \theta_{nm}]$$

Figure 5A:
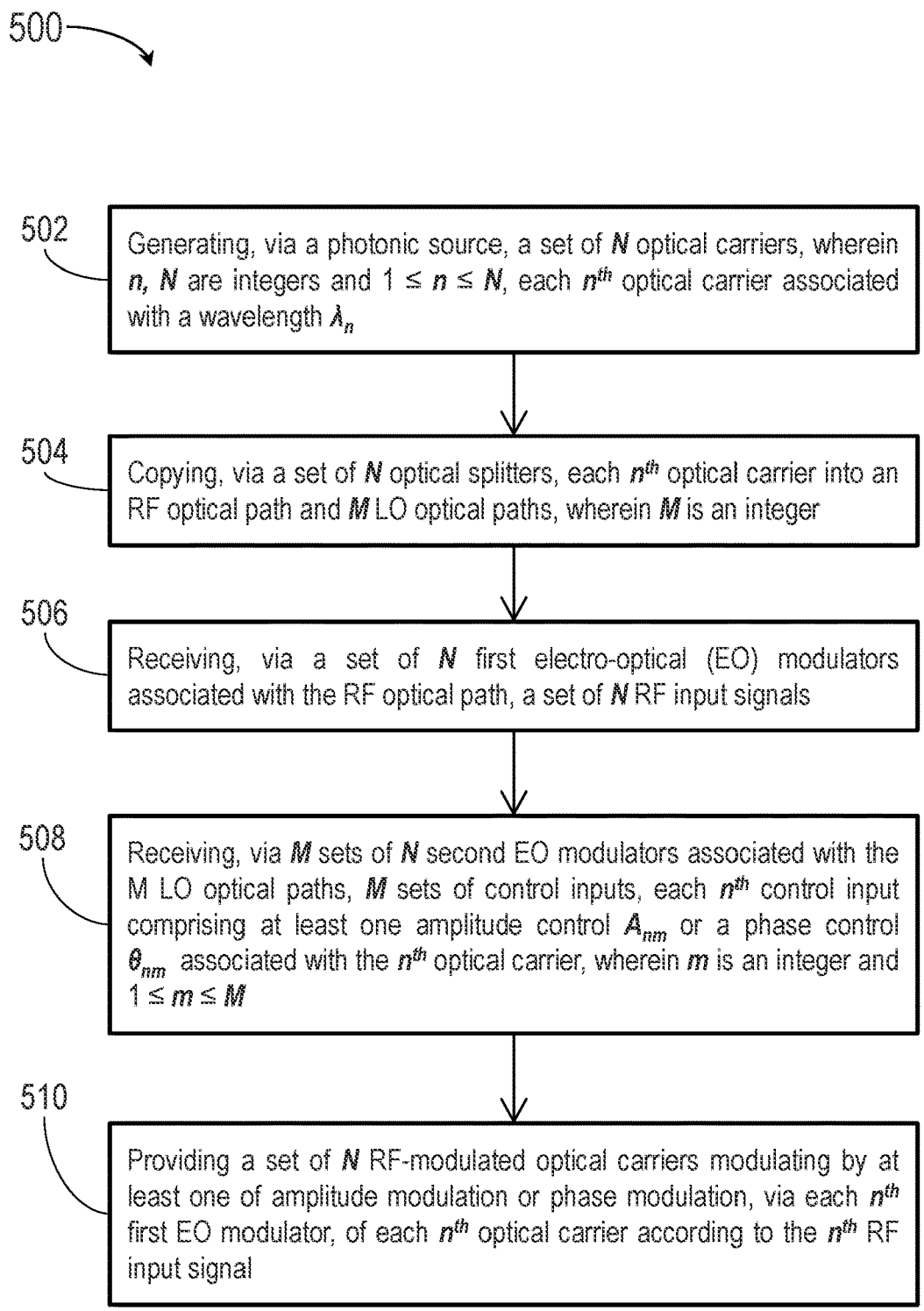

Referring now to FIG. 5A, the method 500 may be implemented by the systems 200, 200a and may include the following steps.

At a step 502, the photonic source generates a set of N optical carriers, each optical carrier having a wavelength $\lambda_1 \ldots \lambda_n \ldots \lambda_N$ and a frequency $f_1 \ldots f_n \ldots f_N$. For example, the photonic source includes a mode locked laser (MLL) or like pulsed source, or a continuous-wave (CW) laser. In embodiments, the photonic source includes an optical frequency comb (OFC) such that each adjacent pair of $n^{th}$, $(n+1)^{th}$ optical carriers are separated in frequency ($f_n$, $f_{n+1}$) by a different frequency $\Delta F$.

At a step 504, each optical carrier is split into an RF-modulation optical path and M local oscillator (LO) modulation optical paths (M≥1).

At a step 506, in the RF-modulation optical path, a set of N electro-optical (EO) RF modulators receives a set of N RF input signals of interest. For example, the EO RF modulators may include any combination of Mach-Zehnder modulators (MZM), amplitude modulators, phase shifters, and/or intensity modulators.

At a step 508, in each $m^{th}$ LO-modulation optical path, a set of N EO LO modulators receives a set of N control inputs (e.g., control signals), each $n^{th}$ control input including an amplitude control $A_{nm}$ or a phase control $\theta_{nm}$ associated with the $n^{th}$ optical carrier (e.g., and an $m^{th}$ of M digital outputs).

At a step 510, in the RF-modulation optical path, each $n^{th}$ EO RF modulator modulates the $n^{th}$ optical carrier according to the $n^{th}$ RF input signal.

Referring also to FIG. 5B, at a step 512, in each $m^{th}$ LO-modulation optical path, each $n^{th}$ EO LO modulator modulates the $n^{th}$ optical carrier according to the amplitude control $A_{nm}$ and/or the phase control $\theta_{nm}$.

At a step 514, in the RF-modulation optical path, a combined RF-modulated optical output is provided by multiplexing the N RF-modulated optical carriers.

At a step 516, in each $m^{th}$ LO-modulation optical path, a combined LO-modulated optical output is provided by multiplexing each $m^{th}$ set of N LO-modulated optical carriers.

At a step 518, M in-phase (I) and quadrature (Q) balanced optical outputs are generated by demodulating (via a set of M coherent receivers) the combined RF-modulated optical output and each $m^{th}$ combined LO-modulated optical output.

At a step 520, M modulated electrical signals are produced by converting, via balanced photodiode pairs, each $m^{th}$ I/Q balanced optical output into a corresponding $m^{th}$ modulated electrical signal. In some embodiments, the photodiodes may perform low pass filtering of the modulated electrical signal.

At a step 522, a set of M modulated digital outputs $R_1 \ldots R_m \ldots R_M$ is produced by digitizing each $m^{th}$ modulated electrical signal. In some embodiments, the in-phase and quadrature optical outputs may be filtered either in the electrical domain (e.g., prior to digitization) or via downstream digital signal processing (DSP) in the digital domain.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for processing of radio frequency (RF) signals, the system comprising:
   at least one photonic source configured to provide a set of N optical carriers, wherein N is an integer;
   M sets of N control inputs, each $m^{th}$ control input comprising at least one of an amplitude control $A_{nm}$ or a phase control $\theta_{nm}$ associated with the $n^{th}$ optical carrier, wherein m, M, n are integers and $1 \leq m \leq M$, $1 \leq n \leq N$;
   a set of N optical splitters coupled to the at least one photonic source, each $n^{th}$ optical splitter configured to split each $n^{th}$ optical carrier into an RF optical path and M local oscillator (LO) optical paths,
   the RF optical path comprising:
      a set of N first electro-optical (EO) modulators coupled to the set of N optical splitters, each $n^{th}$ first EO modulator configured for:
         receiving the $n^{th}$ optical carrier and an $n^{th}$ RF input signal of a set of N RF input signals;
         and
         providing an RF-modulated optical output via at least one of amplitude modulation or phase modulation of the $n^{th}$ optical carrier according to the $n^{th}$ RF input signal;
      a first multiplexer (mux) coupled to the N first EO modulators, the first mux configured to provide a combined RF-modulated optical output by multiplexing the N RF-modulated optical carriers;
   each $m^{th}$ LO optical path comprising:
      a set of N second electro-optical (EO) modulators, each $n^{th}$ second EO modulator configured for:
         receiving the $n^{th}$ optical carrier and the $m^{th}$ control input;
         and
         providing an LO-modulated optical output via at least one amplitude modulation or phase modulation of the $n^{th}$ optical carrier according to at least one of the amplitude control $A_{nm}$ or the phase control $\theta_{nm}$;
         and
      a second multiplexer (mux) coupled to the N second EO modulators, each $m^{th}$ second mux configured to provide an $m^{th}$ combined LO-modulated optical output by multiplexing the N LO-modulated optical carriers;
   a set of M coherent receivers, each $m^{th}$ coherent receiver comprising:
      a demodulator coupled to the first mux and to the $m^{th}$ second mux, the demodulator configured to generate an $m^{th}$ in-phase (I) and quadrature (Q) balanced optical output based on the combined RF-modulated optical output and the $m^{th}$ combined LO-modulated optical output;
      and
      one or more photodiodes configured to provide an $m^{th}$ modulated electrical signal based on each $m^{th}$ in-phase (I) and quadrature (Q) balanced optical output;
   and
   one or more digitizers coupled to the M coherent receivers, the one or more digitizers configured to generate at least one $m^{th}$ digital output based on the $m^{th}$ modulated electrical signal.

2. The system of claim 1, wherein the one or more photodiodes are configured for electrical filtering of the at least one $m^{th}$ modulated electrical signal.

3. The system of claim 1, wherein the one or more digitizers include:
one or more electrical filters configured for filtering of the at least one $m^{th}$ modulated electrical signal.

4. The system of claim 1, further comprising:
one or more digital signal processors (DSP) coupled to the one or more digitizers, the one or more DSP configured for digital filtering of the $m^{th}$ digital output.

5. The system of claim 1, wherein the at least one photonic source includes a pulsed photonic source.

6. The system of claim 1, wherein:
the at least one photonic source includes at least one optical frequency comb (OFC) configured to produce the set of N optical carriers;
and
wherein each adjacent pair of $n^{th}$ and $(n+1)^{th}$ optical carriers are separated in frequency by a difference frequency $\Delta F$.

7. The system of claim 6, wherein the at least one OFC is a first OFC associated with the RF-modulated optical path, the difference frequency is a first difference frequency, and:
the at least one photonic source includes at least one second OFC vernierly related to the first OFC, the at least one second OFC associated with the at least one LO optical path and configured to produce a set of N optical carriers wherein each adjacent pair of $n^{th}$ and $(n+1)^{th}$ optical carriers are separated in frequency by a difference frequency $\Delta F + \delta f$.

8. The system of claim 1, wherein:
the set of N first electro-optical (EO) modulators and the set of N second electro-optical (EO) modulators include at least one of an amplitude modulator, an intensity modulator, a phase shifter, or a Mach-Zehnder modulator (MZM).

9. A method for processing radio frequency (RF) input signals via photonic local oscillator (LO) phase control, the method comprising:
generating, via a photonic source, a set of N optical carriers, wherein n, N are integers and $1 \leq n \leq N$;
copying, via a set of N optical splitters, each $n^{th}$ optical carrier into an RF optical path and M local oscillator (LO) optical paths, wherein M is an integer;
receiving, via a set of N first electro-optical (EO) modulators associated with the RF optical path, a set of N RF input signals;
receiving, via M sets of N second EO modulators associated with the M LO optical paths, M sets of N control inputs, each $n^{th}$ control input comprising at least one of an amplitude control $A_{nm}$ or a phase control $\theta_{nm}$ associated with the $n^{th}$ optical carrier, wherein m is an integer and $1 \leq m \leq M$;
providing a set of N RF-modulated optical outputs by at least one of amplitude modulation or phase modulation, via each $n^{th}$ first EO modulator, of each $n^{th}$ optical carrier according to the $n^{th}$ RF input signal;
providing M sets of N LO-modulated optical outputs by at least one of amplitude modulation or phase modulation, via each $m^{th}$ set of N second EO modulators, of each $m^{th}$ set of N optical carriers according to at least one of the amplitude control $A_{nm}$ or the phase control $\theta_{nm}$;

providing, via a first multiplexer (mux), a combined RF-modulated optical output by multiplexing the N RF-modulated optical outputs;
providing, via a set of M second muxes, M combined LO-modulated optical outputs by multiplexing the M sets of N LO-modulated optical outputs;
generating, via a set of M coherent receivers, M sets of an $m^{th}$ in-phase (I) and quadrature (Q) balanced optical output by demodulating the combined RF-modulated optical output and each $m^{th}$ combined LO-modulated optical output;
converting, via one or more balanced photodiode pairs, each $m^{th}$ I/Q balanced optical output into an $m^{th}$ modulated electrical signal;
and
producing a set of M modulated digital outputs by digitizing each $m^{th}$ modulated electrical signal.

10. The method of claim 9, wherein converting, via one or more balanced photodiode pairs, each $m^{th}$ I/Q balanced optical output into an $m^{th}$ modulated electrical signal includes:
filtering in the electrical domain, via the one or more photodiodes, the at least one $m^{th}$ modulated electrical signal.

11. The method of claim 9, wherein producing a set of M modulated digital outputs by digitizing each $m^{th}$ in-phase (I) and quadrature (Q) balanced optical output includes filtering each $m^{th}$ in-phase (I) and quadrature (Q) balanced optical output in the electrical domain prior to digitization.

12. The method of claim 9, wherein producing a set of M modulated digital outputs by digitizing each $m^{th}$ in-phase (I) optical output and $m^{th}$ quadrature (Q) optical output includes digitally filtering each $m^{th}$ modulated digital output.

13. The method of claim 9, wherein the at least one photonic source includes a pulsed photonic source.

14. The method of claim 9, wherein generating, via a photonic source, a set of N optical carriers includes:
providing, via an optical frequency comb (OFC) associated with the RF optical path, a set of N optical carriers wherein each adjacent pair of $n^{th}$ and $(n+1)^{th}$ optical carriers are separated in frequency by a difference frequency $\Delta F$.

15. The method of claim 14, wherein the OFC is a first OFC, the difference frequency $\Delta F$ is a first difference frequency, and generating, via a photonic source, a set of N optical carriers includes:
providing, via a second OFC associated with the at least one LO optical path, the second OFC vernierly related to the first OFC, the set of N optical carriers wherein each adjacent pair of $n^{th}$ and $(n+1)^{th}$ optical carriers are separated in frequency by a second difference frequency $\Delta F + \delta f$.

16. The method of claim 9, wherein the set of N first electro-optical (EO) modulators and the set of N second electro-optical (EO) modulators include at least one of an amplitude modulator, an intensity modulator, a phase shifter, or a Mach-Zehnder modulator (MZM).

* * * * *